United States Patent [19]

Gentry et al.

[11] Patent Number: 4,675,826

[45] Date of Patent: Jun. 23, 1987

[54] TEMPERATURE CONTROL SYSTEM

[75] Inventors: Charles B. Gentry, Belmont; David R. Dietz, Grand Rapids, both of Mich.

[73] Assignee: Granco-Clark, Inc., Belding, Mich.

[21] Appl. No.: 637,750

[22] Filed: Aug. 6, 1984

[51] Int. Cl.⁴ .................. G06F 15/46; G06G 7/64; F23N 1/00; F27D 3/00

[52] U.S. Cl. .................. 364/477; 364/557; 236/15 BB; 432/11; 72/200; 72/13

[58] Field of Search .......... 432/11, 12, 13, 43, 432/45, 49, 51, 52; 364/477, 472, 469, 468, 557; 72/8, 11, 12, 13, 200, 202; 266/82, 87, 90, 96; 236/15 BB, 15 BC

[56] References Cited

U.S. PATENT DOCUMENTS

| | | | |
|---|---|---|---|
| 3,409,217 | 11/1968 | Gentry | 236/15 |
| 4,027,524 | 6/1977 | Fletcher et al. | 364/557 X |
| 4,125,365 | 11/1978 | Nelson | 266/87 X |
| 4,225,306 | 9/1980 | Wick | 432/52 |
| 4,309,171 | 1/1982 | Gentry | 432/163 |
| 4,359,210 | 11/1982 | Peterson | 266/87 |
| 4,373,364 | 2/1983 | Tanimoto et al. | 364/477 X |
| 4,394,121 | 7/1983 | Wakamiya et al. | 432/11 |
| 4,463,437 | 7/1984 | Schenck et al. | 364/477 X |
| 4,501,552 | 2/1985 | Wakamiya | 236/15 BB |
| 4,577,278 | 3/1986 | Shannon | 364/477 |

FOREIGN PATENT DOCUMENTS

| | | | |
|---|---|---|---|
| 57-111617 | 7/1982 | Japan | 236/15 BB |
| 56-23556 | 9/1982 | Japan | 72/13 |
| 58-6721 | 1/1983 | Japan | 72/200 |
| 105456 | 1/1983 | Japan | 364/557 |
| 0728955 | 4/1980 | U.S.S.R. | 72/200 |
| 0759165 | 8/1980 | U.S.S.R. | 72/13 |

OTHER PUBLICATIONS

Boerger et al., "Diffusion Furnace Control"; *IBM Technical Disclosure Bulletin*, vol. 12, No. 9, Feb. 1970, pp. 1437-1438.

Primary Examiner—Jerry Smith
Assistant Examiner—Jon D. Grossman
Attorney, Agent, or Firm—Varnum, Riddering, Schmidt & Howlett

[57] ABSTRACT

A temperature control system (50) for use in a furnace (10) for heating metal logs (13) as the logs (13) move through a furnace heating chamber (12) includes thermocouples (52a-52e) adapted to sense log temperatures by direct contact during intermittent time intervals when the logs (13) are stationary. Radiation sensors (64a-64 e) continuously sense radiant energy emitted from the logs (13) and a temperature compensation circuit (62) compares signals representative of log temperatures as measured by thermocouples (52a-52e) and the radition sensors (64a-64e). The difference between the signals is utilized during time intervals when the logs (13) are moving as a compensation factor for the continuous signals representative of log temperatures based on sensed radiation. The compensated signals and signals representative of desired set point temperatures are applied to log temperature controllers (80a-80e) to regulate the thermal energy applied to the logs (13).

17 Claims, 3 Drawing Figures

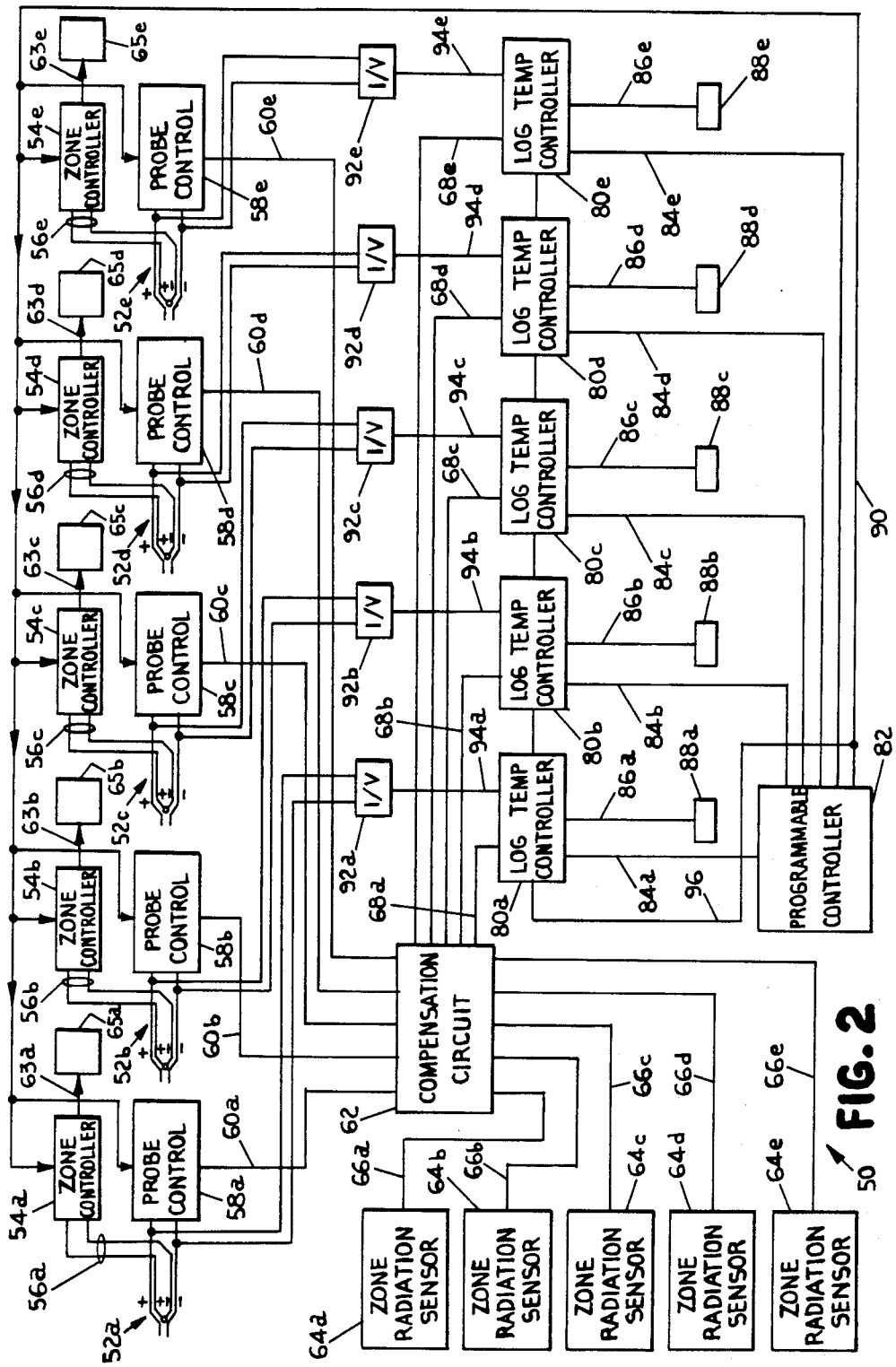

TEMPERATURE CONTROL SYSTEM

TECHNICAL FIELD

The invention relates to furnaces for heating metallic articles to elevated set point temperatures as the articles move through furnace chambers and, more particularly, to control systems for measuring article temperatures and regulating thermal energy applied to the articles.

BACKGROUND ART

Furnaces having heating chambers for heating metal billets to relatively high temperatures for extrusion or similar metal working operations have been commonly used for many years. These furnaces typically include elongated heating chambers in which combustion burners are disposed along the length of the chambers to direct air and fuel combustible mixtures against the billets as they move through the chambers to raise the billets to the desired temperature or "set point". Such furnaces are often of the flame impingement type in which the burner flames envelop the billets within the furnace. For example, one such type of furnace is disclosed in the Gentry U.S. Pat. No. 3,409,217 issued Nov. 5, 1968.

These furnaces usually employ some type of control system for regulating the applied thermal energy to achieve and maintain the requisite set point temperature of the billets. These control systems typically include probes to measure the billet temperatures and a control system to regulate the energy applied to the billets. These systems require that the billets be stationary during the actual temperature measurement.

For example, the Gentry patent discloses an arrangement in which thermocouple probe rods are employed to measure the billet temperatures. The probe rods are moved into contact with the billets when the billets are in a stationary position within the elongated heating chamber. The temperature as measured by the thermocouple probe rods is then utilized by various electrical control apparatus to compare the measured temperature with the desired set point temperature and to apply control signals to a heating system so as to regulate the thermal energy applied to the billets within the heating chamber.

In recent years, the increased cost of producing aluminum has put severe competitive pressures on the extrusion industries. Further, the marketplace has demanded increasingly complex shapes and lengths. These factors have required extruders to maintain a costly inventory of billets to meet these needs. In order to reduce inventory costs, the extrusion industry is using more logs. However, logs must be cut to appropriate size prior to heating, or after heating and before loading into the extrusion press.

When logs are heated prior to shearing, the logs are in a state of movement for a considerable length of time. Accordingly, the time intervals during which the logs are stationary are of insufficient duration to accurately sense log temperatures by the conventional contact probe thermocouples. Thermal energy regulation based on temperature measurements obtained with contact probes or similar devices only during intervals when the logs are stationary can therefore be relatively inaccurate.

In attempting to overcome this problem, various types of continuous temperature sensing devices have been considered. Among such devices are radiation sensors, slide wires and wheels. When used independently, however, these devices have not been particularly accurate, especially when used with aluminum logs. For example, sensing of radiation from aluminum is difficult because of its relatively low emissivity (in the range of 0.05 to 0.15). In addition, emissivity can be dependent on the nature of the aluminum alloy, the casting method and the environmental conditions under which the logs may have been stored prior to heating. Furthermore, radiation sensors are subject to transmission errors resulting from attenuation of the radiation signal across the spacial area between the log and the sensor. For example, the signal can be affected by gases or dust within the transmission chamber or materials collecting on the lens of the optical sensor. Still further, radiation sensors can exhibit background noise resulting from temperature changes within the radiation tube or stray radiation from the furnace.

SUMMARY OF THE INVENTION

In accordance with the invention, a furnace having a heating chamber for heating articles to an elevated set point temperature where the articles are in a stationary state for a first time interval and a moving state for a second time interval following the first time interval has a combination of a mechanical probe and an optical sensor interacting to give an accurate temperature reading for the articles in the furnace. The furnace includes combustion-means for generating and applying thermal energy to heat the articles, and adjustment means for adjusting the amount of thermal energy generated by the combustion means. Temperature control means measure the temperature of the articles and apply a control signal to the combustion adjustment means so as to adjust the temperature of the articles toward the set point temperature.

The temperature control means includes thermocouple means having probe means to selectively contact the articles during the first time interval and for generating a thermocouple temperature signal representative of the article temperature as sensed by the probe means. Radiation sensing means continuously sense radiant energy emitted by the articles and generate a radiation temperature signal representative of the article temperature as based on the sensed radiant energy. Compensation circuit means are responsive to the thermocouple temperature signal and the radiation temperature signal to generate the control signal. The value of the control signal is a function of the article temperature as sensed by the radiation sensing means as corrected by the thermocouple temperature signal.

The compensation circuit means includes means for generating a difference signal representative of the difference between the article temperature as sensed by the thermocouple means during the first time interval, and the article temperature as sensed by the radiation sensing means during the first time interval. The value of the control signal at a given time during the second time interval is a function of the value of the difference signal and the value of the radiation temperature signal at substantially the given time.

The compensation circuit means also includes differencing circuit means connected to the thermocouple means and the radiation sensing means to generate an output signal having a magnitude and polarity indicative of the difference between the values of the thermocouple temperature signal and the radiation temperature signal. Latching circuit means are connected to the differencing circuit means to maintain the output signal at a value corresponding to the value of the output signal obtained during the first time interval. Summation circuit means are connected to the latching circuit means and to the radiation sensing means to generate a compensated temperature signal representative of the sum of the latched output signal and the radiation temperature signal. The compensation circuit means also includes comparison circuit means responsive to the compensated temperature signal and a signal representative of the elevated set point temperature to generate the control signal.

The furnace includes system control means to generate a set point signal representative of the elevated set point temperature and for applying the set point signal to the compensation circuit means. In addition, the combustion adjustment means includes means responsive to the control signal to adjust the volume of air supplied to the combustion means so as to adjust the thermal energy applied to the articles.

The thermocouple means also includes means responsive to electric current flowing through the probe means when the probe means is in contact with the articles to generate the thermocouple temperature signal as a function of the magnitude of the electric current. The furnace further includes means responsive to the temperature of the environment surrounding the probe means and the set point temperature to selectively apply cooling air to the probe means. Furthermore, the furnace includes means for selectively bypassing the radiation sensing means so as to generate the control signal during the second time interval as a function of the article temperature as sensed by the thermocouple means during the first time interval, in a manner independent of the article temperature as sensed by the radiation sensing means.

The furnace is partitioned into a plurality of separate zones, with the combustion adjustment means having means for independently adjusting within each zone the amount of applied thermal energy. The temperature control means includes separate ones of the thermocouple means, radiation sensing means and compensation circuit means for each of the zones. A plurality of control signals, corresponding in number to the number of zones, are applied to the combustion adjustment means to adjust the temperature of the articles within each zone toward an elevated set point temperature selected for the corresponding zone.

In one embodiment of the invention, the thermocouple means includes means responsive to the electric current flowing through the probe means while the probe means is in contact with the articles to generate the thermocouple temperature signal as an electric current having a magnitude proportional to the magnitude of the current through the probe means. The radiation sensing means includes means for continuously and optically sensing the radiant energy emitted by the articles. The radiation temperature signal is generated as an electric current proportional to the temperature of the articles as indicated by the magnitude of the sensed radiant energy. The compensation circuit means includes means for comparing the values of the thermocouple temperature signal and the radiation temperature signal generated during the first time interval, and for generating a difference signal based on the comparison.

The compensation circuit means further includes means for adding the difference signal to the radiation temperature signal to generate a compensated temperature signal. In addition, means are provided for comparing the compensated temperature signal with a signal representative of the set point temperature to generate the control signal based on the comparison.

A method in accordance with the invention includes the steps of applying thermal energy within the furnace chamber to heat the articles, measuring the temperature of the articles and adjusting the amount of applied thermal energy in accordance with the measured temperature so as to adjust the temperature of the articles toward the set point temperature. The method further includes the steps of sensing the temperature of the articles by directly contacting the articles with a thermocouple during a first time interval when the articles are in a stationary state. A thermocouple temperature signal is generated representative of the temperature of the articles during the first time interval as sensed by the thermocouple. The radiant energy emitted by the articles is continuously sensed and a radiation temperature signal is generated representative of the temperature of the articles based on the sensed radiant energy. Furthermore, a control signal is generated having a value at a given time during a second time interval when the articles are in a moving state which is a function of the article temperature as sensed by the thermocouple during the first time interval and the article temperature as represented by the sensed radiant energy at substantially the given time.

The method also includes generating a difference signal representative of the difference between the article temperature as sensed by the thermocouple during the first time interval and the article temperature as represented by the emitted radiant energy during the first time interval. The value of the control signal at a given time during the second time interval is a function of the value of the difference signal and the value of the radiation temperature signal at substantially the given time. In addition, the method includes generating a difference signal having a magnitude and polarity indicative of the difference between the magnitude of the thermocouple temperature signal and the radiation temperature signal. The difference signal is maintained at a value corresponding to the value of the signal obtained during the first time interval, and a compensated temperature signal is generated representative of the sum of the values of the difference signal and the radiation temperature signal.

BRIEF DESCRIPTION OF THE DRAWINGS

A preferred embodiment of the invention will now be described with reference to the drawings in which:

FIG. 2 is a block diagram representation of a temperature control system in accordance with the invention.

BEST MODE FOR CARRYING OUT THE INVENTION

Figure 1:
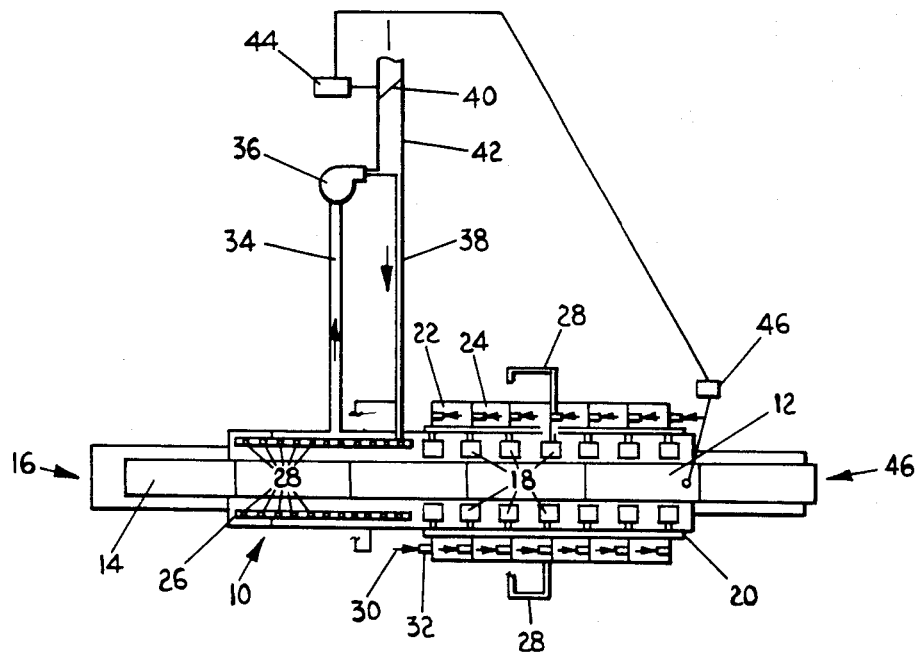
FIG. 1 a schematic representation of a prior art furnace system in which a temperature control system in accordance with the invention can be employed.

The principles of the invention are disclosed, by way of example, in a temperature control system which can be employed in a log heating furnace 10 as depicted in FIG. 1. The furnace 10 can be adapted to heat metal logs 13, such as aluminum, to sufficiently high temperatures for production of articles by extrusion or similar processes.

The logs 13 are typically moved through the furnace heating chamber 12 intermittently, but move at a relatively rapid rate, to move the end log to a shear press where it is sheared to desired lengths. The uncut portion of the log is then moved back into the furnace heating chamber 12. As with billets, control of the log temperatures is of primary importance. However, the time periods during which the logs remain stationary are of a substantially less frequency and duration than occur when billets are being processed.

The heating furnace 10 depicted in FIG. 1 is substantially described in the U.S. Pat. No. 4,309,171 issued to Gentry on Jan. 5, 1982. The furnace 10 includes the elongated heating chamber 12 and a preheater zone 14. The preheater zone 14 includes an entrance 16 through which the logs 13 can enter the furnace 10. The movement of the logs 13 through heating chamber 12 and preheater zone 14 can be accomplished with various well-known control components (not shown). With the furnace 10 adapted to heat metal logs 13 composed of materials such as aluminum, the process can include movement of the logs 13 into the furnace, movement out of an exit location 46, shearing of a portion of the logs 13, and then return movement back into the furnace 10.

A plurality of gas burners 18 can be disposed along the length of the elongated heating chamber 12 for purposes of providing thermal energy to heat the logs 13. In addition, the heating chamber 12 can be partitioned into a number of regions or zones, wherein separate temperature measurements can be made for each zone and the gas burners 18 associated with each of the zones can be separately controlled.

Fuel can be supplied to the burners 18 by means of a gas manifold 20. Correspondingly, combustible air for purposes of providing an air/fuel combustion mixture can be supplied through air pipes 22 and combustion air manifold 24. Although the furnace 10 typically would use natural gas as a fuel for the gas burner 16, a liquid fuel, such as fuel oil, could be supplied through a separate conduit 30 and atomized by injectors 32 into the heated combustion air.

The preheater zone 14 of the furnace 10 can include jet pipes 26 extending longitudinally along zone 14. The pipes 26 can be provided with nozzles 28 for purposes of providing a turbulent gas fluid within the preheater zone 14.

As also shown in FIG. 1, a duct 34 can be employed to draw exhaust gases from the preheater zone 14 by means of a fan 36. In addition, a supply conduit 38 can interconnect the exhaust from fan 36 with the jet pipes 26 disposed in the preheater zone 14. The fan 36 thus pressurizes hot exhaust gases before passing them to the jet pipes 26 so as to increase the turbulent gas fluid flow within the preheater zone 14. A damper valve 40 is disposed within a stack 42 and is regulated by a valve actuator 44 so as to maintain pressure at the log exit end 46 at a predetermined value. A pressure sensor 48 is interconnected with the valve actuator for purposes of detecting pressure at the log exit 46. The aforedescribed preheater and exhaust gas recovery arrangement is merely an exemplary portion of a log heating furnace and does not form any of the basic principles of the invention.

To process the aluminum logs 13 for subsequent shearing and extrusion, the logs 13 must be heated to an appropriate temperature, commonly referred to as the "set point" temperature. For example, for shearing and extrusion of aluminum logs, the set point temperature can be approximately 950° F. To achieve the appropriate set point temperature, the combustion rate of the gas burners 16 shown in FIG. 1 must be controlled to regulate the thermal energy applied to the logs 13. Furthermore, measurements of the temperatures of logs 13 must be made to appropriately regulate the combustion rate of the burners 16.

Figure 3:
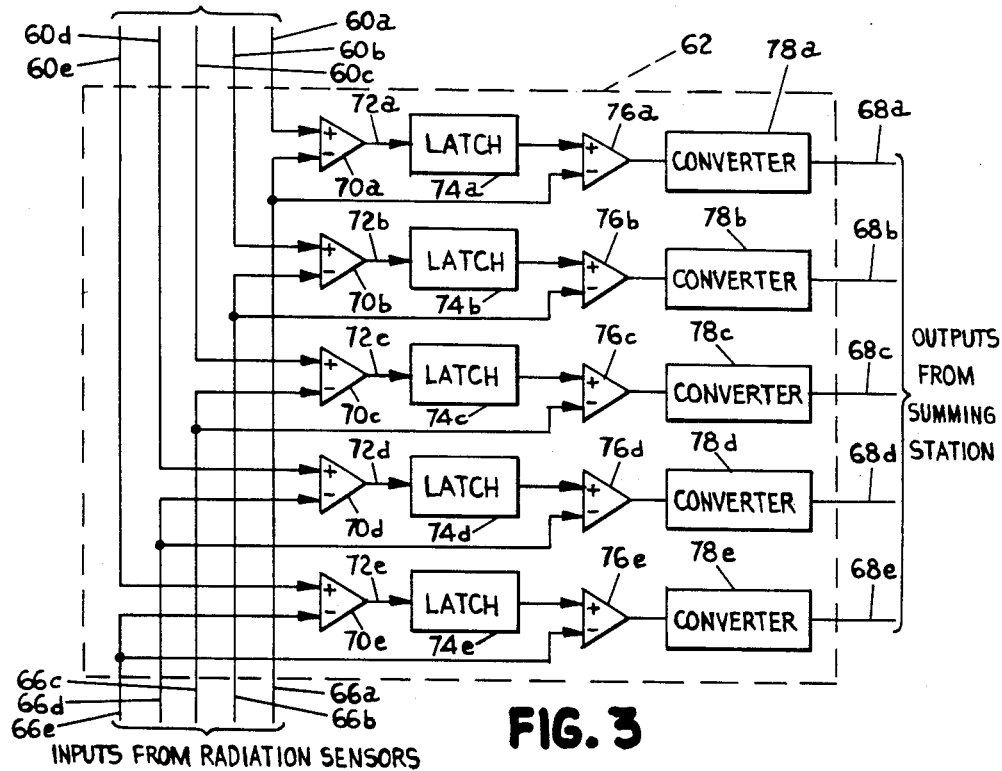
FIG. 3 is a schematic circuit diagram of a compensation circuit which can be employed in the temperature control system shown in FIG. 2.

The principles of a temperature control system in accordance with the invention are disclosed, by way of example, in the control system 50 depicted in FIGS. 2 and 3. With reference to the furnace system 10 shown in FIG. 1, the control system 50 can be adapted to monitor the temperature of the logs 13 as they move through the elongated heating chamber 14 and to regulate the combustion rate of the burners 18 by, for example, regulating the air volume supplied to the burners 18 through manifold 24. In addition, the control system 50 can also provide separate temperature measurements and combustion rate control for each zone or region of the elongated heating chamber 14. For example, in the temperature control system 50 shown in FIG. 2, the heating chamber (not shown) is assumed partitioned into five separate regions or zones a through e, with each zone having its own temperature measurement and combustion control apparatus as described in subsequent paragraphs herein. For purposes of description, numerical references to elements of control system 50 associated with specific zones include a suffix (a–e) indicative of the associated zone.

Referring to FIG. 2, each of the five zones a through e includes one of a series of thermocouples 52a–52e for measuring temperatures of the logs 13 by direct contact during time intervals when the logs 13 are stationary. For example, although not specifically depicted in the drawings, the thermocouples 52a–52e can each comprise a pair of temperature detecting probe rods or similar devices which can be pneumatically controlled so as to be extended towards and contact the logs 13 during the stationary time periods. Such thermocouples are well-known in the art of billet or log heating furnace design, and typically operate on the principle that when a billet or log forms a closed path between probe rods having a given electric potential between the rod ends, the current flowing through the rods will be proportional to the temperature of the billet or log. An example of a pneumatically controlled thermocouple having probe ends for measuring temperatures in billet heating furnaces is described in the commonly assigned U.S. Pat. No. 3,409,217 issued to Gentry on Nov. 5, 1968.

Each of the thermocouples 52a–52e is connected to a corresponding one of the probe control assemblies 58a–58e. Each of the probe control assemblies 58a–58e can comprise various electromechanical components for purposes of pneumatically operating the probe rods of the thermocouples 52a–52e and for detecting the electric current passing through the probe rods during contact with the logs 13. The probe control assemblies 58a–58e also include additional circuitry to apply an appropriate electrical signal on a corresponding one of the probe temperature lines 60a–60e to the temperature compensation circuit 62. The signals on lines 60a–60e will have a magnitude proportional to the log temperature detected by the corresponding one of the thermocouples 52a–52e.

Each of the thermocouples 52a–52e can also include components for measuring the temperature of the environment surrounding the contact probes of the thermocouples 52a–52e and applying signals on lines 56a–56e to a corresponding one of the zone controllers 54a–54e. These signals applied to the controllers 54a–54e can be representative of the environmental temperatures, and can be used by the controllers 54a–54e to apply appropriate activation signals on lines 63a–63e which are connected to cooling air assemblies 65a–65e for purposes of supplying cooling air to maintain the probe rods at or near the desired set point temperatures of the logs 13. Various devices can be employed for providing cooling capacity to the thermocouples 52a–52e and the detailed structure and function of the cooling air assemblies 65a–65e do not form a part of the invention.

As also shown in FIG. 2, the temperature control system 50 includes a series of five zone radiation sensors 64a–64e, one radiation sensor for each separate zone of the heating furnace 10. Each of the radiation sensors 64a–64e comprises a means for continuously measuring the radiant energy or "emissivity" of the logs 13 when they are located within the corresponding zone. The term "emissivity" refers to the radiant energy emitted from the surface of an article and is dependent upon the surface temperature. Various known types of sensors can be employed. For example, each of the radiation sensors 64a–64e can include an optical pyrometer and associated circuitry for detecting the radiant energy emitted by the logs 13. The sensors 64a–64e each also include additional conventional circuitry for applying electrical radiation temperature signals to corresponding ones of the measured emissivity lines 66a–66e. The signals applied on lines 66a–66e will have a magnitude proportional to the log temperatures as represented by the measured emissivity.

It should be noted that the log temperature functional relationship of the electrical signals applied to emissivity lines 66a–66e should be equal in magnitude to the functional relationship of the log temperature electrical signals on probe temperature lines 60a–60e. For example, if an electrical signal on measured emissivity line 66a has a magnitude representative of a log temperature of 900° F. as optically detected by the corresponding radiation sensor 64a, an electrical signal on probe temperature line 60a representative of thermocouple 52a detecting a 900° F. log temperature should preferably have an identical magnitude.

The electrical signals on measured emissivity lines 66a–66e representative of the log temperatures corresponding to the continuously measured log surface emissivity are applied as input signals to the temperature compensation circuit 62. The temperature compensation circuit 62 is responsive to the electrical signals on measured emissivity lines 66a–66e and the electrical signals on probe temperature lines 60a–60e to generate electrical output signals on corresponding ones of the compensated temperature lines 68a–68e. The signals on lines 68a–68e correspond to log temperatures as continuously measured by optical means through the radiation sensors 64a–64e. In addition, however, the compensation signals on lines 68a–68e also include temperature correction factors determined in accordance with the log temperatures detected by the thermocouples 52a–52e during time intervals when the logs 13 are stationary.

An exemplary circuit configuration of the temperature compensation circuit 62 to achieve the aforedescribed compensation functions in accordance with the invention is depicted in FIG. 3. Referring to FIG. 3, and specifically to circuit components associated with the zone a, the probe temperature signal on line 60a and the measured emissivity signal on line 66a are each applied as input signals to a differencing circuit 70a. The differencing circuit 70a is a conventional circuit adapted to generate an output signal on line 72a corresponding to the difference in magnitude between the probe temperature signal on line 60a and the measured emissivity signal on line 66a. The signal lines 60a and 66a are connected to input terminals of differencing circuit 70a in a manner so that the polarity of the output signal on line 72a will be positive when the magnitude of the electrical signal on line 60a is greater than the magnitude of the electrical signal on line 66a.

The output signal on line 72a representing the difference between the probe temperature signal and the measured emissivity signal is applied to a latch circuit 74a. Latch circuit 74a is a conventional circuit which can have additional control inputs (not shown) for purposes of latching the magnitude of its output signal to the value of the applied input signal on line 72a during a prior time interval. Specifically, the latch circuit 74a can comprise various well known flip-flop circuit configurations, with an enable signal applied to determine the latch timing. As described in subsequent paragraphs herein, the latch circuit 74a is controlled in a manner so that its output signal is latched to the magnitude of the input signal on line 72a obtained when the probe temperature signal on line 60a is representative of the log temperature detected by thermocouple 52a during the immediately prior time interval when the logs 13 were stationary.

The output signal from latch circuit 74a is applied as an input signal to a summation circuit 76a. Also applied as an input signal to summation circuit 76a is the measured emissivity signal on line 66a. Circuit 76a can be any conventional circuit configuration adapted to generate an electrical output signal having a magnitude corresponding to the sum of the input signal magnitudes.

For purposes of subsequent signal processing, the output signal from summation circuit 76a can be applied to a current/voltage converter circuit 78a adapted to convert current input signals to proportional voltage output signals. The output signal from converter circuit 78a corresponds to the compensated temperature signal on line 68a as previously described.

The temperature compensation circuit 62 also includes circuit configurations identical to that described above for each of the zones b, c, d, and e. Accordingly, the output of the compensation circuit 62 comprises five compensated temperature signals, each being applied to a corresponding one of the output lines 68a–68e.

Referring again to FIG. 2, and referring specifically to temperature control elements for zone a, the compensating signal on compensated temperature line 68a is applied as an input signal to a log temperature controller 80a. In addition, a second input signal from a system programmable controller 82 is applied to log temperature controller 80a through line 84a. The input signal on line 84a is representative of the desired set point temperature for the logs 13 within zone a.

The log temperature controller 80a is responsive to the compensated temperature signal from line 68a and the set point temperature signal from line 84a to generate a combustion motor control signal on line 86a and apply the same as an input signal to drive motor actuator assembly 88a. The motor control signal on line 86a is representative of the difference between the desired set point log temperature and the measured log temperature. Although not specifically depicted in the drawings, the drive motor actuator assembly 88a can include electromechanical circuitry to control the combustion air supplied to the gas burners 18 in a manner so as to increase or decrease the thermal energy applied to the logs 13, dependent upon whether the measured log temperature is below or above the desired set point temperature. It is apparent that similar circuit components and signals are provided for each of the zones b through e.

The log temperature controllers 80a–80e can comprise any of several types of electromechanical circuitry and, for example, can include a Model 560 temperature controller manufactured by the Barber Coleman Company. The drive motor actuators 88a–88e can also comprise conventional electromechanical circuitry, such as the Barber-Coleman Model EA51-000000-000 drive motor actuators.

The differences between the compensated measured log temperatures and the desired set point temperatures for each zone as determined by the log temperature controllers 80a–80e can also be applied as input signals to the programmable controller 82 through line 96 as shown in FIG. 2. These input signals can be utilized by the programmable controller 82 for various purposes, including generating visual read-outs of the temperature states of each zone of the furnace. In addition, signals relating to the desired set point temperatures and the compensated measured log temperatures can be applied through the control of programmable controller 82 on line 90 to the various zone controllers 54a–54e as previously described herein. The zone controllers 54a–54e can utilize the signals representative of desired set point temperatures to determine, for example, whether the previously described cooling air assemblies 65a–65e should be activated.

The temperature control system 50 as shown in FIG. 2 can also include various other electrical or electromechanical components for performing various functions. For example, each of the thermocouples 52a–52e, can be connected to a corresponding one of a series of current/voltage converter circuits 92a–92e. The converter circuits 92a–92e can be utilized to apply an electrical voltage signal on corresponding ones of the alternate control lines 94a–94e to the corresponding log temperature controllers 80a–80e. The purpose of such alternative temperature control is to effectively bypass the temperature detection functions performed by the zone radiation sensors 64a–64e in the event of circuit or other types of malfunctions.

A general description of the sequential operation of the temperature control system as applied to a furnace such as the log heating furnace 10 shown in FIG. 1 will now be described with respect to FIGS. 2 and 3. For purposes of clarity, the operation of the temperature control system 50 will be described solely with respect to zone a and the electrical and electromechanical circuitry associated therewith. It should be emphasized that identical functions will occur for each of the other zones b–e of the furnace 10.

While the logs 13 are in either a moving state or a stationary position, the radiation sensor 64a will be continuously monitoring the emissivity of the logs 13 while they are within zone a. An electrical signal representative of a log temperature R as indicated by the measured emissivity is correspondingly continuously applied on line 66a as an input signal to the temperature compensation circuit 62. As shown in FIG. 3, this emissivity measured temperature signal on line 66a is applied as an input signal to both the negative input terminal of differencing circuit 70a and an input terminal of the summation circuit 76a. Although this measured emissivity signal represents a "good" approximation of the actual log temperature, various environmental conditions can affect the accuracy of the temperature measurement as previously described in the section entitled "Background of the Invention". For example, with the radiation sensor 64a employing optical techniques, dirt or dust within the space between the logs and the optical sensing devices can affect detected emissivity and, accordingly, the accuracy of the electrical signal on line 66a representative of the measured temperature as indicated by the detected emissivity. Other environmental conditions as also previously described can affect accuracy of temperature measurements by radiation sensing devices.

Assuming that at a time $t = T_1$, the logs 13 within zone a are stopped and remain in a stationary state for a predetermined first interval of time $T_s$, the programmable controller 82 applies signals to operate the probe control 58a so as to extend the probes of thermocouple 52a into direct contact with the logs 13. The thermocouple 52a thus obtains a direct contact temperature measurement $P_1$ of the logs 13 during the stationary time interval $T_1 < t < T_1 + T_s$. The probe control circuit 58a is responsive to the temperature measurement $P_1$ to generate an electrical signal on line 60a representative of the probe measured temperature. This signal is applied as an input signal to the positive input terminal of difference circuit 70a. Prior to resumption of movement of the logs 13, the programmable controller 82 will apply appropriate signals to the probe control circuit 58a so as to retract the probes of thermocouple 52a from the logs 13.

The differencing circuit 70a generates an output signal on line 72a representative of the difference between the probe measured temperature $P_1$ and the radiation sensor measured temperature $R_1$ obtained during the first stationary time interval. This difference signal on line 72a is applied through latch circuit 74a to one input terminal of the summation circuit 76a. Applied to another input terminal of the summation circuit 76a is the signal on line 66a representative of the radiation sensor measured temperature $R_1$. The output of the summation circuit is applied through a current/voltage converter to the compensated temperature line 68a.

The latch circuit 74a can be appropriately controlled (for example, by signals from the programmable controller 82) to latch the input signal to summation circuit 76a to the magnitude of the output signal from difference circuit 70a obtained during the stationary time interval $T_1 < t < T_1 + T_s$. This signal magnitude will remain latched until the next time interval during which the logs 13 are held stationary.

When the logs resume movement after the first stationary time interval, the radiation sensor 64a will continue to monitor emissivity and generate the electrical signal on line 66a representative of log temperature R as indicated by measured emissivity. This signal will be continuously applied as an input signal to summation circuit 76a as is the latched signal on line 72a from difference circuit 70a.

In accordance with the foregoing, the output signal from summation circuit 76a on line 68a represents, at all times, the instantaneous log temperature R as indicated by measured emissivity, with a correction or compensation factor added thereto. The correction factor, corresponding to the latched signal on line 72a, represents the difference between the log temperature $P_1$ detected by probes of thermocouple 52a and the log temperature $R_1$ detected by radiation sensor 64a during the immediately prior time interval when logs 13 were held stationary and a direct contact probe temperature reading was obtained from thermocouple 52a.

For example, if the probe measured temperature during the first stationary time interval was 900° F., and the radiation sensor measured log temperature was 850° F. during the same time interval, the latched compensation signal on line 72a would correspond to a temperature differential, or correction factor, of 50° F. This latched compensation signal and correction factor is then utilized during the time between the first stationary time interval and the next stationary time interval when a second probe temperature measurement is obtained. Accordingly, if the radiation sensor measured log temperature rose to 875° F. at some time between the first and second stationary time intervals, the compensated temperature signal on line 68a would indicate a log temperature of 925° F.

To state the compensation arrangement in another manner, the environmental conditions affecting accuracy of the radiation sensor temperature measurements will tend to remain somewhat constant during the time between intervals when the logs are stationary. The compensation circuit 62 thus advantageously obtains a correction factor indicative of the inaccuracy or "skew" of the radiation sensor measurement by comparing the radiation sensor temperature measurement with the relatively accurate thermocouple probe measurement obtained during time intervals when the logs are stationary. This correction factor is then applied to subsequent temperature measurements continuously obtained by the radiation sensor when the logs 13 are moving, until the next stationary time interval when a new correction factor is obtained by a new temperature measurement from the probes of thermocouple 52a.

As discussed during the prior description of the structure of temperature control system 50, the compensated temperature indicated by the signal on line 68a is applied as an input signal to log temperature controller 80a. The log temperature controller 80a is responsive to the compensated temperature signal and signals representative of the desired set point temperature to apply control signals on line 86a to control the combustion air drive motor actuator 88a. The drive motor actuator 88a will operate combustion air control valves in a conventional manner so as to either increase or decrease the combustion rate and heat energy applied to the logs in a manner so as to move the log temperature toward the desired set point temperature.

Each of the other zones b through e include circuitry as previously described which function in a manner identical to the functional operation of circuitry associated with zone a. As also previously described, the temperature control system 50 can include a separate circuit path from the thermocouple 52a through current/voltage converter 92a to the log temperature controller 80a. This separate circuit path can be employed if the radiation sensor 64a or other circuitry associated with the compensation arrangement malfunctions or must be brought off line for maintenance.

It should be emphasized that the particular circuit configuration of the temperature control system 50 as described herein is not meant to be an exhaustive enumeration of the specific circuit configurations which can be utilized in accordance with the invention. For example, various types of analog or digital logic circuitry could be employed to perform the differencing, latching and summation functions associated with the temperature compensation circuit 62. Accordingly, it will be apparent to those skilled in the pertinent arts that modifications and variations of the above-described illustrative embodiments of the invention can be effected without departing from the spirit and scope of the novel concepts of the invention.

The embodiments of the invention in which an exclusive property or privilege is claimed are defined as follows:

1. In a furnace for heating articles to an elevated set point temperature and comprising a heating chamber through which the articles are moved and wherein the articles are in a stationary state for at least a first time interval and in a moving state for at least a second time interval following the first time interval, combustion means for generating and applying thermal energy within the chamber to heat the articles, combustion adjustment means for adjusting the amount of thermal energy generated by the combustion means, and temperature control means for measuring the temperature of the articles and applying a control signal to the combustion adjustment means so as to adjust the temperature of the articles toward the set point temperature, the improvement wherein the temperature control means comprises:

thermocouple means comprising probe means adapted to selectively contact the articles during the first time interval for sensing the temperature of the articles and for generating a thermocouple temperature signal representative of the temperature of the articles during the first time interval as sensed by the probe means;

radiation sensing means for sensing the radiant energy emitted by the articles and for generating a radiation temperature signal representative of the temperature of the articles based on the sensed radiant energy; and compensation circuit means connected to the combustion adjustment means and responsive to the thermocouple temperature signal and the radiation temperature signal for generating the control signal, wherein the value of the control signal at a given time during the second time interval is a function of the article temperature as sensed by the thermocouple means during the first time interval and the article temperature as sensed by the radiation sensing means at substantially the given time.

2. A furnace in accordance with claim 1 wherein the compensation circuit means comprises means for generating a difference signal representative of the difference between the article temperature as sensed by the thermocouple means during the first time interval and the article temperature as sensed by the radiation sensing means during the first time interval, and the value of the control signal at a given time during the second time interval is a function of the value of the difference signal and the value of the radiation temperature signal at substantially the given time.

3. A furnace in accordance with claim 1 wherein the compensation circuit means comprises:
differencing circuit means connected to the thermocouple means and the radiation sensing means for generating an output signal having a magnitude and polarity indicative of the difference between the magnitude of the thermocouple temperature signal and the magnitude of the radiation temperature signal;
latching circuit means connected to the differencing circuit means for maintaining the output signal at a value corresponding to the value of the output signal obtained during the first time interval; and
summation circuit means connected to the latching circuit means and to the radiation sensing means for generating a compensated temperature signal representative of the sum of the values of the latched output signal and the radiation temperature signal.

4. A furnace in accordance with claim 3 wherein the compensation circuit means further comprises comparison circuit means connected to the summation circuit means and responsive to the compensated temperature signal and a signal representative of the elevated set point temperature for generating the control signal as a function of the difference between the compensated temperature signal and the set point temperature signal.

5. A furnace in accordance with claim 1 and further comprising system control means for generating a set point signal representative of the elevated set point temperature and for applying the set point signal to the compensation circuit means.

6. A furnace in accordance with claim 1 and further comprising means for supplying air to the combustion means, and the combustion adjustment means comprises means responsive to the control signal for adjusting the volume of air supplied to the combustion means so as to adjust the thermal energy applied to the articles.

7. A furnace in accordance with claim 1 wherein the thermocouple means comprises means responsive to electric current flowing through the probe means when the probe means is in contact with the articles for generating the thermocouple temperature signal as a function of the magnitude of the electric current.

8. A furnace in accordance with claim 1 wherein the furnace is partitioned into a plurality of separate zones and further comprises means for selecting an elevated set point temperature for each zone, the combustion adjustment means comprises means for independently adjusting within each zone the amount of thermal energy generated by the combustion means, and the temperature control means further comprises separate ones of the thermocouple means, radiation sensing means and compensation circuit means for each of the zones so that a plurality of control signals, corresponding in number to the number of zones, are applied to the combustion adjustment means to adjust the temperature of the articles within each zone toward the elevated set point temperature selected for each zone.

9. A furnace in accordance with claim 1 and further comprising means for measuring a temperature of the environment surrounding the probe means, and means responsive to the measured temperature of the environment surrounding the probe means and the set point temperature to selectively apply cooling air to the probe means.

10. A furnace in accordance with claim 1 wherein the temperature control means further comprises means for selectively bypassing the radiation sensing means and for generating the control signal during the second time interval as a function of the article temperature sensed by the thermocouple means during the first time interval and independent of the article temperature as sensed by the radiation sensing means.

11. A furnace in accordance with claim 1 wherein:
the thermocouple means comprises means responsive to electric current flowing through the probe means while the probe means is in contact with the articles for generating the thermocouple temperature signal as an electric current having a magnitude proportional to magnitude of the current through the probe means;
the radiation sensing means comprises means for optically and continuously sensing the radiant energy emitted by the articles and for generating the radiation temperature signal as an electric current proportional to the temperature of the articles as indicated by the magnitude of the sensed radiant energy; and
the compensation circuit means comprises means for comparing the values of the thermocouple temperature signal and the radiation temperature signal generated during the first time interval, generating a difference signal based on the comparison, and adding the difference signal to the radiation temperature signal to generate a compensated temperature signal.

12. A furnace in accordance with claim 11 wherein the compensation circuit means further comprises means for comparing the compensated temperature signal with a signal representative of the set point temperature and for generating the control signal based on the compensated temperature and set point temperature signal comparison.

13. In a furnace comprising a plurality of zones for heating articles to elevated set point temperature selected for each zone and further comprising an elongated heating chamber through which the articles are moved, combustion means for selectively generating and applying within each zone thermal energy to heat the articles to the selected set point temperatures, combustion adjustment means for selectively adjusting within each zone the amount of thermal energy generated by the combustion means, and a plurality of temperature control means, corresponding in number to the plurality of zones, for measuring the temperature of the articles within each zone and for applying control signals to the combustion adjustment means so as to adjust the temperature of the articles within each zone toward the set point temperature selected for the corresponding zone, the improvement wherein each of the temperature control means comprises:
a plurality of thermocouple probes adapted to selectively contact the articles during a first time interval when the articles are in a stationary state within the heating chamber for sensing the temperatures of the articles within the corresponding zones;
probe control means responsive to electric current flowing through the probes when the probes are in contact with the articles for generating probe temperature signals representative of the temperature of the articles as sensed by the probes during the first time interval while the articles are in a stationary state;

radiation sensing means for optically and continuously sensing radiant energy emitted by the articles while the articles are within corresponding zones and while the articles are in a stationary state or a moving state, and for generating radiation temperature signals representative of the temperatures of the articles based on the sensed radiant energy;

compensation circuit means connected to the probe control means and the radiation sensing means for generating the control signals so that the value of each control signal at a given time when the articles are in a moving state corresponds to the sum of the corresponding radiation temperature signal at substantially the given time and the difference in values between the corresponding probe temperature signal and the corresponding radiation temperature signal during an immediately prior first time interval when the articles were in a stationary state.

14. A furnace in accordance with claim 13 and further comprising control means for generating a set point signal for each of the plurality of zones corresponding to selected set point temperatures for the zones, and for applying the set point signal to the compensation circuit means associated with the corresponding zone.

15. In a method for heating articles to an elevated set point temperature within a heating chamber of a furnace through which the articles are moved, and comprising the steps of:

applying thermal energy within the chamber to heat the articles;

measuring the temperature of the articles; and adjusting the amount of applied thermal energy in accordance with the measured article temperature so as to adjust the temperature of the articles toward the set point temperature;

the improvement wherein the method further comprises the steps of:

sensing the temperature of the articles by direct contact of the articles with at least one thermocouple during a first time interval when the articles are in a stationary state, and generating a thermocouple temperature signal representative of the temperature of the articles during the first time interval as sensed by the at least one thermocouple;

sensing the radiant energy emitted by the articles and generating a radiation temperature signal representative of the temperature of the articles based on the sensed radiant energy;

generating a control signal during a second time interval when the articles are in a moving state and following the first time interval, wherein the value of the control signal at a given time during the second time interval is a function of the value of the radiation temperature signal at substantially the given time and the value of the thermocouple temperature signal during the first time interval; and adjusting the amount of applied thermal energy in accordance with the value of the control signal.

16. The method in accordance with claim 15 and further comprising the steps of:

generating a difference signal representative of the difference between the article temperature as sensed by the at least one thermocouple during the first time interval and the article temperature as based on the emitted radiant energy sensed during the first time interval; and generating the control signal so that the value of the control signal at a given time during the second time interval is a function of the value of the difference signal and the value of the radiation temperature signal at substantially the given time.

17. The method in accordance with claim 16 and further comprising the steps of:

generating a difference signal having a magnitude and polarity corresponding to the difference between the magnitude of the thermocouple temperature signal and the magnitude of the radiation temperature signal;

maintaining the difference signal during the second time interval at a value corresponding to the value of the difference signal as obtained during the first time interval; and generating a compensated temperature signal representative of the sum of the values of the difference signal and the radiation temperature signal.

* * * * *